United States Patent
Jones

(10) Patent No.: US 9,128,304 B2
(45) Date of Patent: Sep. 8, 2015

(54) ILLUMINATED EYEWEAR

(71) Applicant: Brian Jones, Orange, CA (US)

(72) Inventor: Brian Jones, Orange, CA (US)

( * ) Notice: Subject to any disclaimer, the term of this patent is extended or adjusted under 35 U.S.C. 154(b) by 29 days.

(21) Appl. No.: 14/175,916

(22) Filed: Feb. 7, 2014

(65) Prior Publication Data

US 2015/0226985 A1    Aug. 13, 2015

(51) Int. Cl.
| | | |
|---|---|---|
| G02C 1/00 | (2006.01) | |
| G02C 11/04 | (2006.01) | |
| G02C 5/14 | (2006.01) | |
| G02C 5/22 | (2006.01) | |
| G02C 3/00 | (2006.01) | |
| G02C 13/00 | (2006.01) | |

(52) U.S. Cl.
CPC ............... G02C 11/04 (2013.01); G02C 3/006 (2013.01); G02C 5/146 (2013.01); G02C 5/22 (2013.01); G02C 13/00 (2013.01)

(58) Field of Classification Search
CPC ......... G02C 11/02; G02C 3/003; G02C 3/006
USPC ................ 351/158, 51, 52, 41; 362/103, 105; D16/306, 309
See application file for complete search history.

(56) References Cited

U.S. PATENT DOCUMENTS

| | | |
|---|---|---|
| 4,254,451 A | 3/1981 | Cochran, Jr. |
| 4,822,161 A | 4/1989 | Jimmy |
| 4,828,355 A * | 5/1989 | Lipson et al. .................. 351/51 |
| 5,946,071 A | 8/1999 | Feldman |
| 6,196,680 B1 * | 3/2001 | Novak ............................ 351/51 |
| 6,857,739 B1 | 2/2005 | Watson |
| 6,997,552 B1 | 2/2006 | Hung |
| 7,175,273 B2 | 2/2007 | Lee |
| D668,704 S | 10/2012 | Menard et al. |
| 2005/0278003 A1 | 12/2005 | Feldman |
| 2007/0081324 A1 | 4/2007 | Schrimmer et al. |
| 2008/0297716 A1 | 12/2008 | Tsai |

FOREIGN PATENT DOCUMENTS

CN         201749265 U    2/2011

* cited by examiner

*Primary Examiner* — Hung Dang
(74) *Attorney, Agent, or Firm* — Klein, O'Neill & Singh, LLP

(57) ABSTRACT

Illuminated eyewear includes a frame having a front frame portion attached to two temple portions. The temple portions are hingedly attached to the frame portion so as to rotate between an open and a closed position. An electroluminescent wire extends along top and bottom edges of both temple portions and the front frame. The electroluminescent wire extends across any gap at the hinges between the temples and front frame. Thus, at the hinges, the portions of the wire on the top and bottom edges are spaced apart from one another. A portion of the wire adjacent each hinge is unconnected to the associated edge so that the wire can slide over the edge surface as the temple pieces move between the open and closed positions.

17 Claims, 12 Drawing Sheets

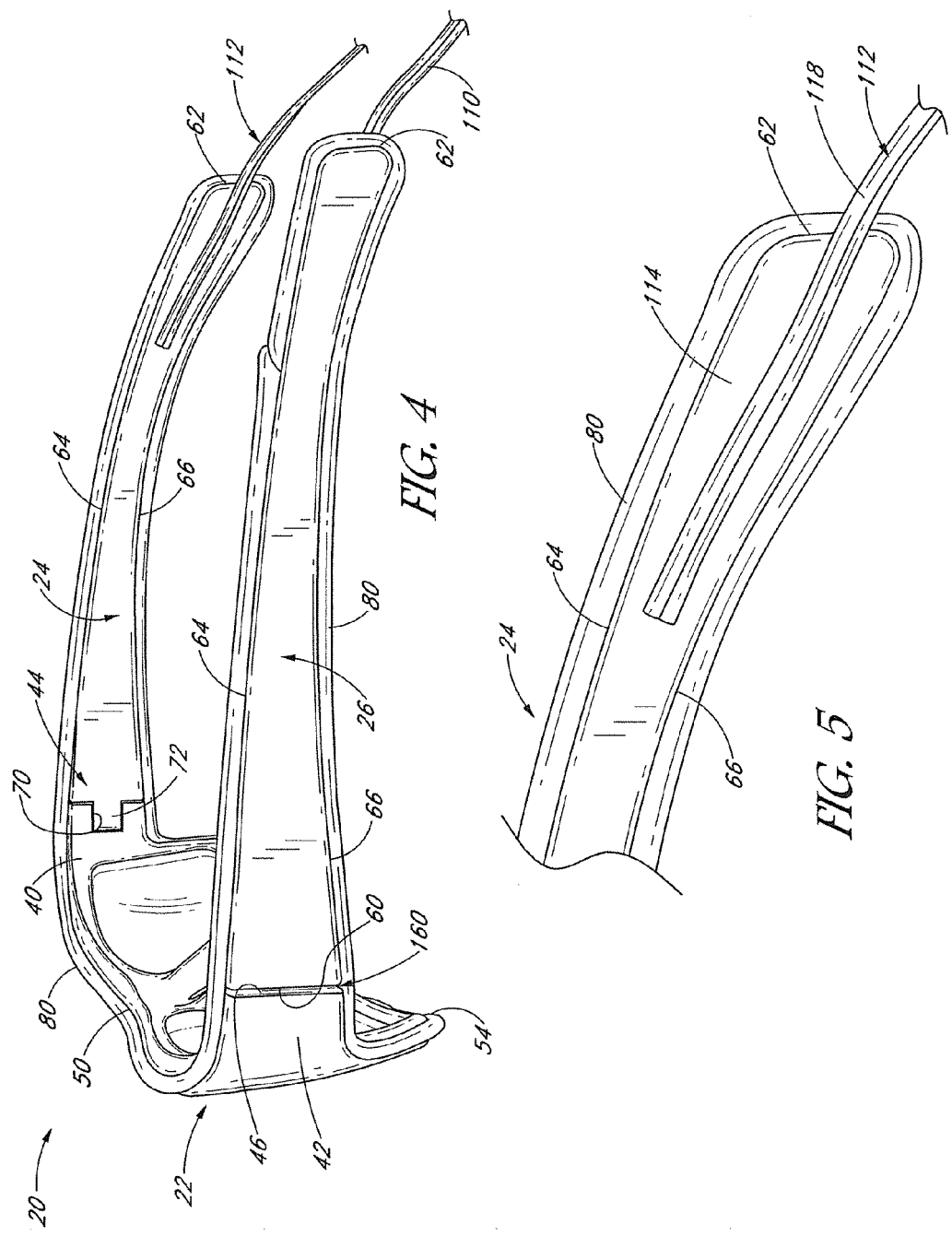

ILLUMINATED EYEWEAR

BACKGROUND

The present disclosure relates to the field of eyewear, and more particularly to illuminated eyewear and methods for illuminating eyewear.

Individuals wear eyewear to satisfy a wide range of needs. For example, prescription and/or reading glasses can be worn to correct impaired vision, and sunglasses are widely worn to protect the wearer's eyes from exposure to sunlight.

Eyewear can also make a fashion statement. People often choose their eyewear so as to portray a desired look. Some individuals have no need for vision correction, but still wear eyewear exclusively for the look. Sometimes eyewear is worn as a novelty device.

Illuminated eyewear can be used for medical as well as novelty purposes. Eyeglasses can have light sources, such as light emitting diodes (LEDs) implanted in or around the frame or lenses. However, such light sources typically need a power source, and mounting heavy batteries or electronics tends to make the eyewear heavy, uncomfortable and expensive. It can also detrimentally affect the look of the eyewear. Further, mounting of and distribution of light sources can be difficult, and some methods can only be used with specific eyewear styles.

SUMMARY

Accordingly, there is a need in the art for illuminated eyewear that is comfortable and attractive. Further, there is a need to provide power for illuminated eyewear in a manner that doesn't adversely affect the eyewear's look, comfort or function. Still further, there is a need for a method to provide illuminated eyewear in a wide range of styles while maintaining a high quality product.

In accordance with some embodiments, an illuminated eyewear is provided having a frame comprising a front frame portion and first and second temple pieces that are hingedly connected to the front frame portion. The front frame portion has first and second tenons, each tenon having a tenon hinge surface. A first edge of the front frame portion extends from the first tenon to the second tenon. A second edge of the front frame portion also extends from the first tenon to the second tenon and is spaced from the first edge of the front frame portion. The tenon hinge surfaces extend between the first and second edges of the front frame portion. Each of the first and second temple pieces are elongate, extending from a temple hinge surface to a back edge. The first and second temple pieces also have spaced apart first and second edges that extend from the temple hinge surface to the back edge. The back edge and temple hinge surface each extend between the first and second edges of the temple piece. The temple pieces are hingedly attached to the front frame portion so that the temple pieces rotate between an open position and a closed position. Each temple hinge surface faces the associated tenon hinge surface when in the open position. A hinge gap is defined between each edge of the front frame tenon and the associated edge of each temple piece. An elongate illuminated member is adhered to the first edges of the first and second temple pieces and front frame portion. The elongate illuminated member spans the hinge gap along the first edge between the first temple portion and the front frame and spans the hinge gap along the first edge between the second temple portion and the front frame. An unconnected zone is defined along the first edges at and adjacent each hinge gap. The elongate illuminated member is not adhered to the frame in the unconnected zone so that the illuminated member can slide over the associated first edge when the temple pieces move between the open and closed positions.

In additional embodiments, the elongate illuminated member is adhered to the second edges of the first and second temple pieces and front frame portion. The elongate illuminated member spans the hinge gap along the second edges between the first temple portion and the front frame and spans the hinge gap along the second edges between the second temple portion and the front frame. Also, the illuminated member is not adhered to the frame in an unconnected zone defined along the second edges at and adjacent each hinge gap.

In yet additional embodiments, at each of the hinge gaps the portion of the elongate illuminated member extending along the first edges is spaced from the portion of the elongate illuminated member extending along the second edges.

In further embodiments, the unconnected zone defined along the second edges is aligned with the unconnected zone defined along the first edges.

In yet further embodiments the elongate illuminated member joins the first edge of the first temple at a beginning point, and the illuminated member extends from the beginning point along first edges of the first temple, front frame and at least part of the second temple. The elongate illuminated member crosses from the first edge of the second temple to the second edge of the second temple, and extends along the second edges of the second temple, front frame and at least part of the first temple. The elongate illuminated member then crosses from the second edge of the first temple to the first edge of the first temple. A terminal end of the elongate illuminated member is at or adjacent the beginning point.

In some such embodiments, the elongate illuminated member extends along the back edges of the first and second temples. In other such embodiments, the elongate illuminated member crosses between the first and second edges of each temple at a location spaced from the back edge of the respective temple.

In still further embodiments, a first end of the elongate illuminated member is attached to an inner surface of the first temple, and the elongate illuminated member transitions from the inner surface to the first edge at an angle between about 30-60° relative to the temple edge. In yet further embodiments, the terminal end of the elongate illuminated member is cut at an angle between about 30-60° relative to the temple edge.

In additional embodiments, the first and second edges each can comprise a seat configured to receive at least a portion of the elongate illuminated member.

Yet another embodiment additionally comprises a power driver suspended on a lanyard comprising a powered portion and a non-powered portion. The non-powered portion of the lanyard connects the power driver to the second temple piece. The powered portion of the lanyard connects the power driver to the first temple piece.

In still another embodiment, a length of the unconnected zone changes as the first temple piece is rotated between the open and closed positions, and the elongate illuminated member is adhered to the first edges so that the length of the elongate illuminated member between opposite ends of the unconnected zone is no less than a maximum length of the unconnected zone.

In some such embodiments, the powered portion of the lanyard can be connected to the inner surface of the first temple piece and can comprise a first end electrically connected to the elongate illuminated member so that tension within the powered portion of the lanyard is communicated to the first temple piece and not the elongate illuminated member.

In some embodiments the elongate illuminated member comprises an electroluminescent wire.

In accordance with another embodiment, the present disclosure provides a method of making an illuminated eyewear. The method includes adhering an elongate illuminatable member along a length of a first edge of a first temple piece of an eyewear frame so that the elongate illuminatable member is aligned with the first edge. The first temple piece and a second temple piece of the eyewear frame are hingedly connected to a front frame portion so that the first and second temple pieces can rotate between an open and a closed position. The first edge of the first temple piece is aligned with a first edge of the front frame portion when the first temple piece is in the open position. A joint is defined between the first temple piece and the front frame portion when the first temple piece is in the open position. The method also includes adhering the elongate illuminatable member to the edge of the front frame portion so that an unconnected portion is defined along one or both of the first edges at and adjacent the joint, and arranging the elongate illuminatable member in the unconnected portion so that it is aligned with the first edge and traverses the joint in the unconnected portion when in the open position. As such, the elongate illuminatable member slides over the edge in the unconnected portion when the first temple piece is rotated from the open position to the closed position. The elongate illuminatable member can be connected to a source of electrical power.

In some such embodiments, connecting the source of electrical power to the elongate illuminatable member comprises connecting a first end of a power wire to a power output of a power driver and connecting a second end of the power wire to the elongate illuminatable member. The method and additionally comprises attaching the portion of the power wire spaced from the second end to the temple piece so that tension forces in the power wire are transferred to the temple piece and not to the elongate illuminatable member.

In another embodiment, the unconnected portion has a maximum length when the first temple piece is at a point between the open and closed positions. Such other embodiments can additionally comprise attaching the elongate illuminatable member to the first edges when the first temple piece is positioned at the point.

BRIEF DESCRIPTION OF THE DRAWINGS

FIG. 4 is a side view of the eyewear of FIG. 1;

FIG. 5 is a close up view of an inner side of a right temple of FIG. 1;

DESCRIPTION

Figure 1:
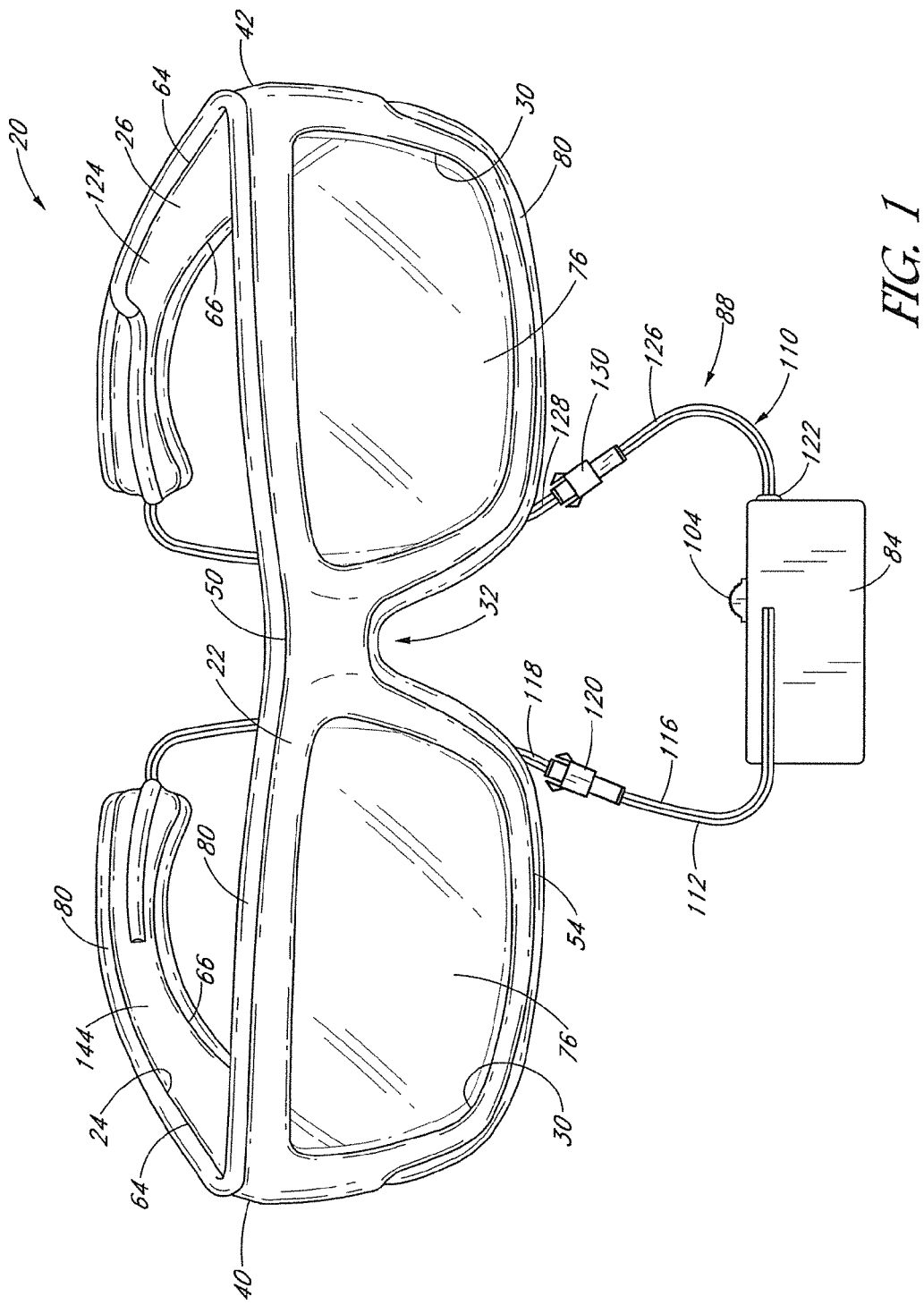
FIG. 1 is a front perspective view of an embodiment of eyewear configured in accordance with the present disclosure.
Figure 2:
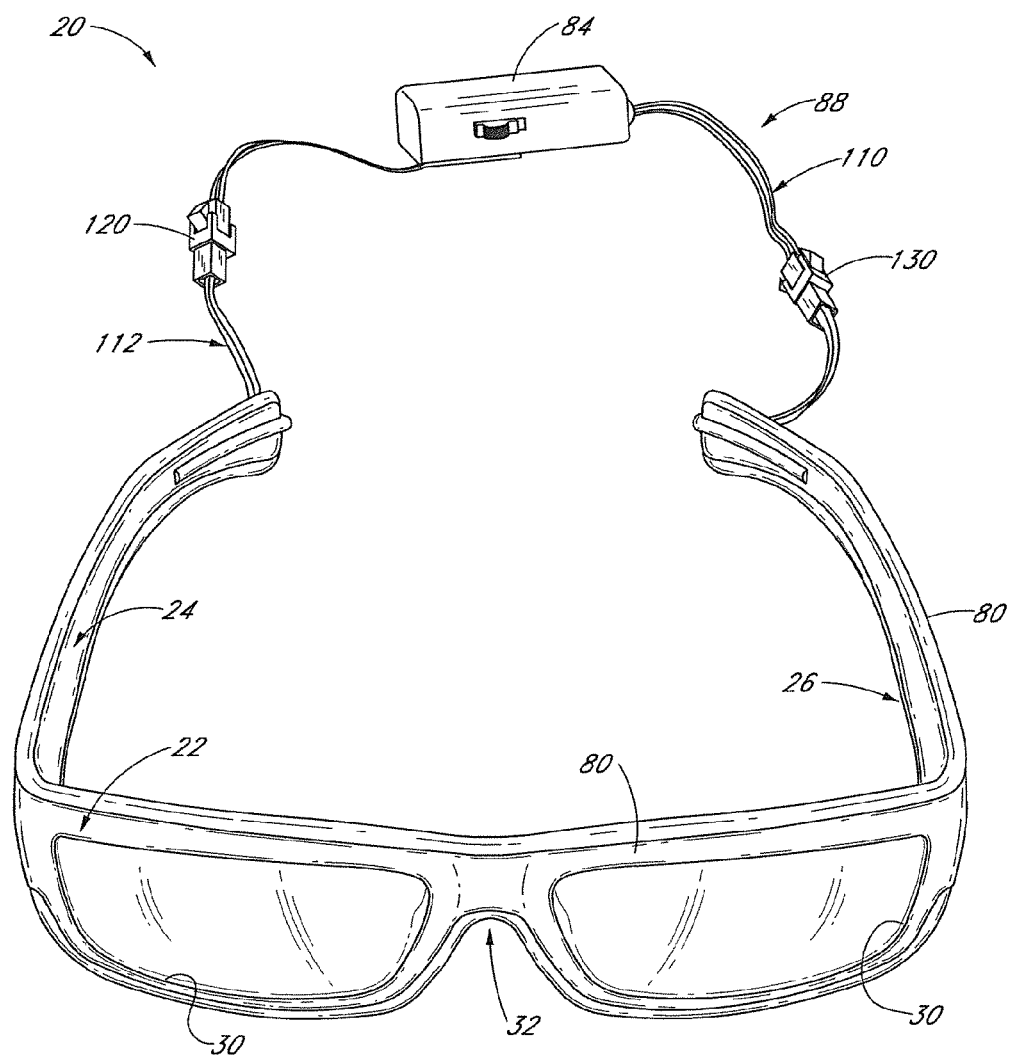
FIG. 2 is a top perspective view of the eyewear of FIG. 1.
Figure 3:
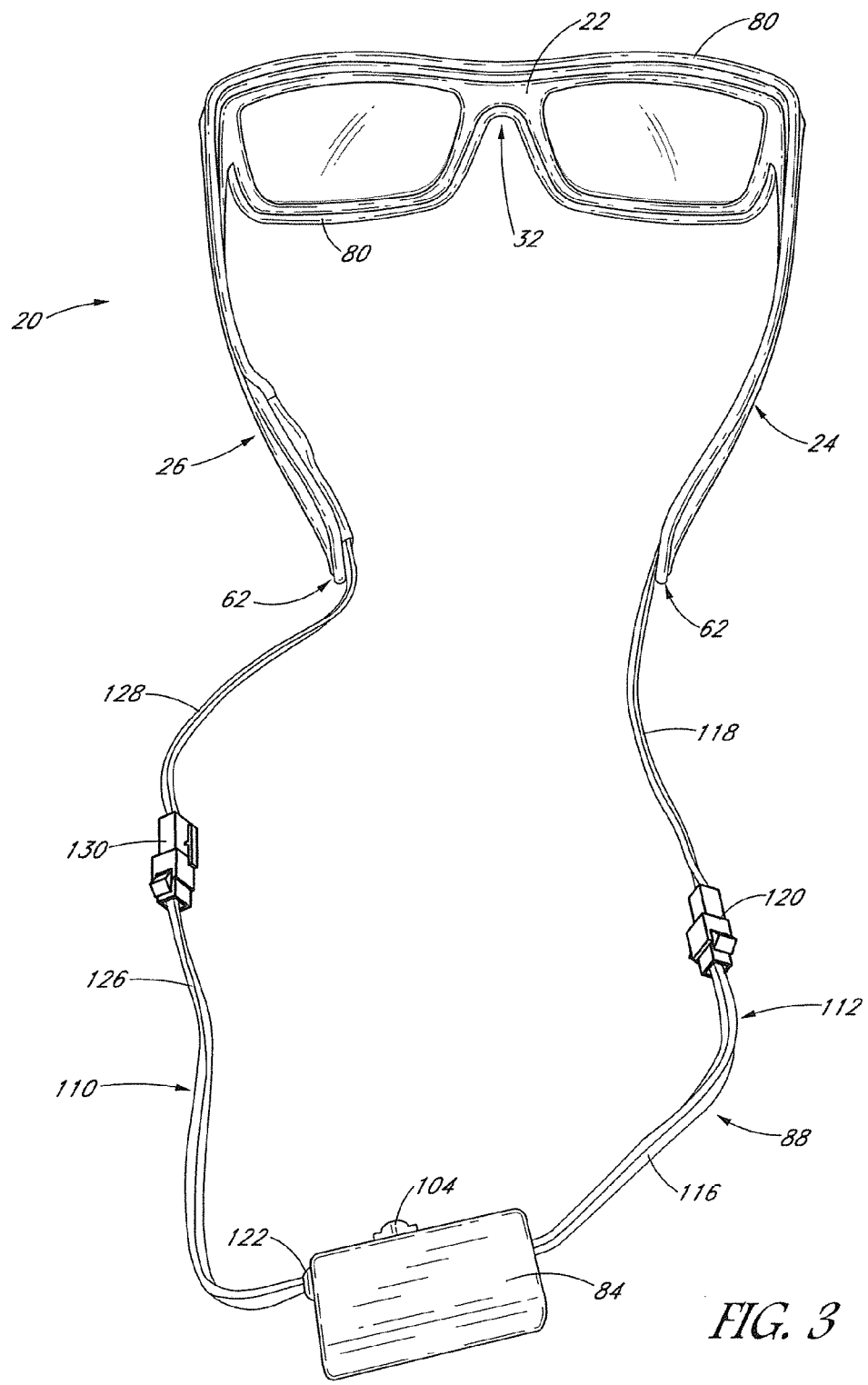
FIG. 3 is a back perspective view of the eyewear of FIG. 1.

The present disclosure describes embodiments of eyewear and a method of making illuminated eyewear. FIGS. 1-10 illustrate the structure and method in accordance with one style of eyewear. This is done for convenience, as the method and structure described herein can be applied to various shapes and styles of eyewear.

With initial reference to FIGS. 1-4, an embodiment of illuminated eyewear 20 is shown. The illustrated eyewear includes a frame 20 made up of a front frame portion 22, or front piece, and right and left temple portions 24, 26, or side pieces. The front frame portion 22 is configured to fit across a user's face and defines two lens openings 30 that are configured to hold lenses 76. A nose cavity 32 is a configured to accommodate a wearer's nose. Opposing right and left tenons 40, 42 are disposed on the right and left edges of the front frame 22, respectively. Each tenon 40, 42 functions as a transition from the front frame 22 to a hinge 44. In the illustrated embodiment, each tenon 40, 42 extends backwardly relative to the rest of the front frame 22 and terminates in a hinge surface 46.

An upper or first edge 50 is defined along the front frame 22 above the lens openings 30 and runs from tenon to tenon, terminating at the hinge surfaces 46. A lower or second edge 54 is defined along the front frame 22 below the lens openings 30 and also runs from tenon to tenon, terminating at the hinge surfaces 46. The upper and lower edges 50, 54 are spaced from one another.

The right and left temples 24, 26, or side pieces, each are elongate, extending from a side piece hinge surface 60 to a back edge 62. As such, when the eyeglasses are in an open position as depicted in FIGS. 1-4, the right and left temples 24, 26 extend rearwardly from the front frame 22, and preferably from the wearer's face backwardly and past the wearer's ears. An upper or first edge 64 of each temple portion extends along a top of the temple portion from the hinge surface 60 to the back edge 62. A lower or second edge 66 extends along the bottom of each temple portion from the hinge surface 60 to the back edge 62. The back edge 162 extends between the upper and lower edges 64, 66. As such the upper and lower edges 64, 66 are spaced apart from one another along the length of each temple 40, 42.

In the illustrated embodiment, the lower edge 66 is curved so as to accommodate a wearer's ear, and extends somewhat downwardly toward the back edge 62 portion, which is configured to be placed behind the wearer's ear. Other embodiments may have other shapes that employ different curvature or no curvature at all, and can have different lengths, widths, or the like.

In the illustrated embodiment, and with particular reference to FIG. 4, each tenon 40, 42 in the illustrated embodiment includes a hinge receiver portion 70 and each corresponding temple portion 24, 26 has a hinge projection 72 that fits within the hinge receiving portion 70 of the associated tenon 40, 42. As such a hinge 44 is defined so that the temple portion 24, 26 may rotate between the open position depicted in FIGS. 4 and 9A and the closed position depicted in FIG. 9B. The hinge surfaces 46, 60 of the tenon 40, 42 and temple 24, 26 generally abut or sit adjacent one another when the frame is in the open position.

Although the hinge 44 is incorporated into the tenon 40, 42 and temple 24, 26 in the illustrated embodiment, it is to be understood that there are several different structures employed for establishing a hinge in various styles of eyewear. For example, in some embodiments a hinge member is formed separately from the frame and is attached to the front frame and temple so as to hingedly attach the front frame to the temple. Accordingly, for purposes of this disclosure, the hinge should be considered any method and apparatus that enables a temple piece to rotate relative to a front frame piece between an open and closed position.

Some hinges enable rotation of up to about 90° between the open and closed positions, while other hinges may enable more or less rotation and more or less of a complete closure of the temple pieces relative to the frame. Some hinges even enable rotation of the temple pieces outwardly from the front frame beyond the illustrated open position. Although a wide variety of specific styles and structures are anticipated, preferably such hinge structures enable the temple pieces 24, 26 to rotate about the front frame tenons 40, 42 so that the position and/or orientation of the adjacent front frame and temple hinge surfaces 46, 60 change relative to one another between the open and closed positions.

In the illustrated embodiment, lenses 76 are fit into the lens portions 30 of the front frame 22. However, it is to be understood that in some embodiments, a wearer may choose to not have any lenses 76 at all fit into the frame 20. Also, various types of lenses may be employed. For example, in some embodiments the lenses will be prescription optical lenses. In other embodiments the lenses may not have any prescription, may or may not be polarized or have any optical feature at all. In some embodiments, the lenses may comprise diffraction lenses or 3-D anaglyph lenses. They may be mirrored, interchangeable, and may employ various light effects or not. In still other embodiments the lenses may include other structure, such as shutters. Further, in still other embodiments, the lenses may have features having nothing to do with optics.

In the illustrated embodiment, the front frame 22 and temple pieces 24, 26 are formed of injection-molded plastic, and have the particular style as shown. It is to be understood, however, that several different styles and shapes of eyewear frames 20 can be employed and still use the principles discussed herein. Further, various materials can be used for eyeglass frames including, for example, plastic, wire, other metal configurations, or combinations of materials. Additionally, in the illustrated embodiment, the nose cavity 32 is configured so that the lower edge rests on the wearer's nose. In other embodiments, frames may include a separately-formed nose piece that extends from the frame and provides nose pads which will rest on a wearer's nose.

With reference now to FIGS. 1-10, an elongate illuminated member 80 is attached to the frame 20 so as to span the upper edges 50, 64 of the front frame 22 and both temples 24, 26, wrap about the back edges 62 of the temple pieces 24, 26, and span the lower edges 66, 54 of the temples 24, 26 and front frame 22. A driver 84 provides power to the illuminated member 80. As shown, the driver 84 is attached to a lanyard 88 that is in turn attached to the temple pieces 24, 26.

In the illustrated embodiment, the illuminated member 80 comprises a single electroluminescent wire that is configured to glow when attached to a source of electricity. In one embodiment, the electroluminescent wire 80 comprises a first or inner wire 90 that is surrounded by or coated by a phosphor layer 92. A second or outer wire 94 is wound about the phosphor layer 92, and an outer sleeve 96 encloses the wires 90, 94 and phosphor 92. The outer sleeve 96 can include a protective sleeve and can be colored or textured as desired. When electrical current is applied across the inner and outer wires 90, 94, the phosphor layer 92 glows, resulting in the elongate illuminated member 80 glowing along its length.

Figure 10A:
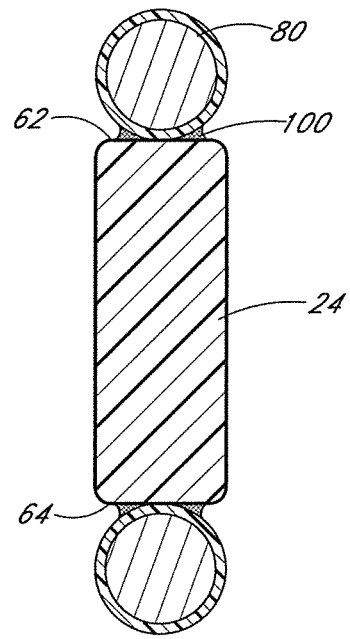
FIG. 10A is a sectional view taken along line 10-10 of FIG. 8.
Figure 10B:
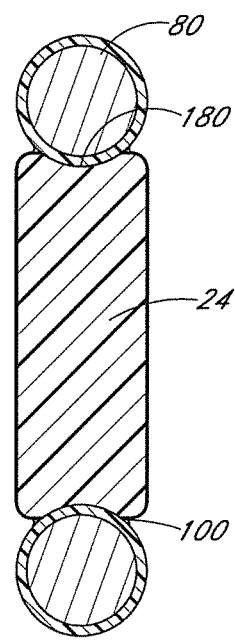
FIG. 10B shows the sectional view of FIG. 10A configured in accordance with another embodiment.
Figure 11:
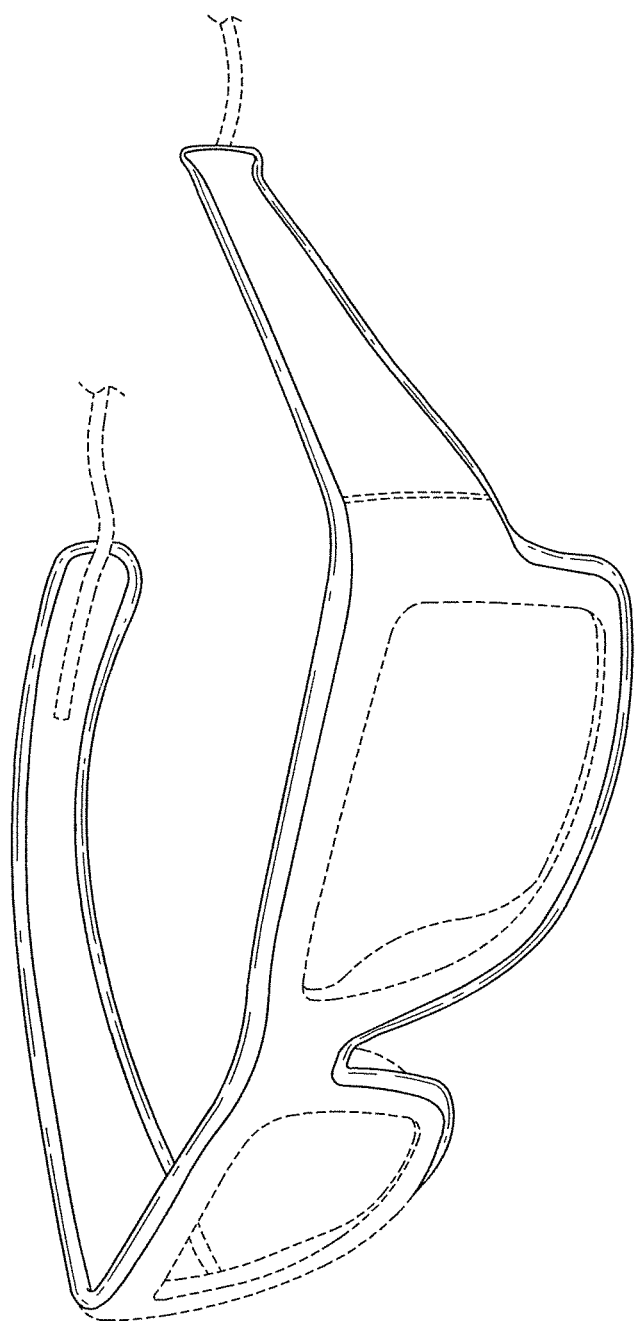
FIG. 11 is a perspective view of eyewear configured in accordance with one embodiment.
Figure 13:
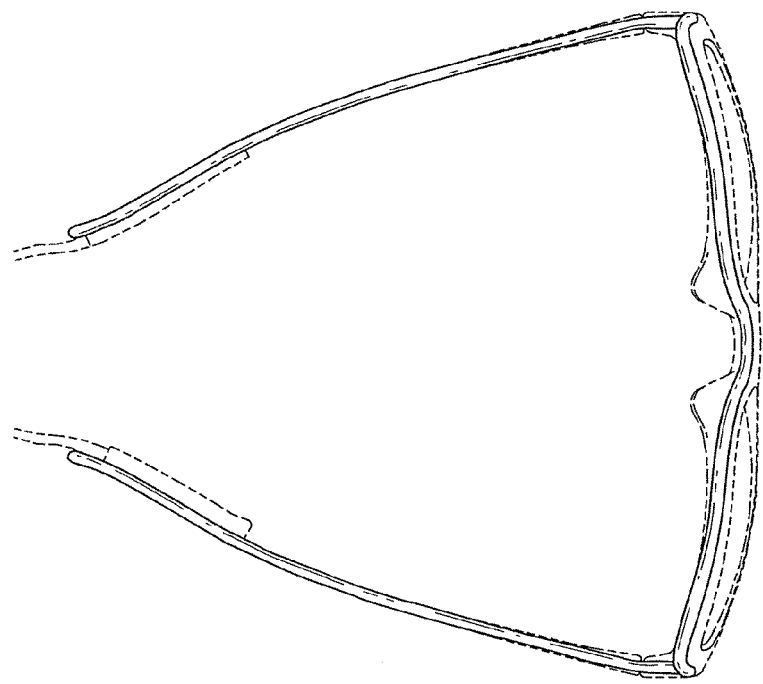
FIG. 13 is a bottom view of the embodiment of FIG. 11.
Figure 12:
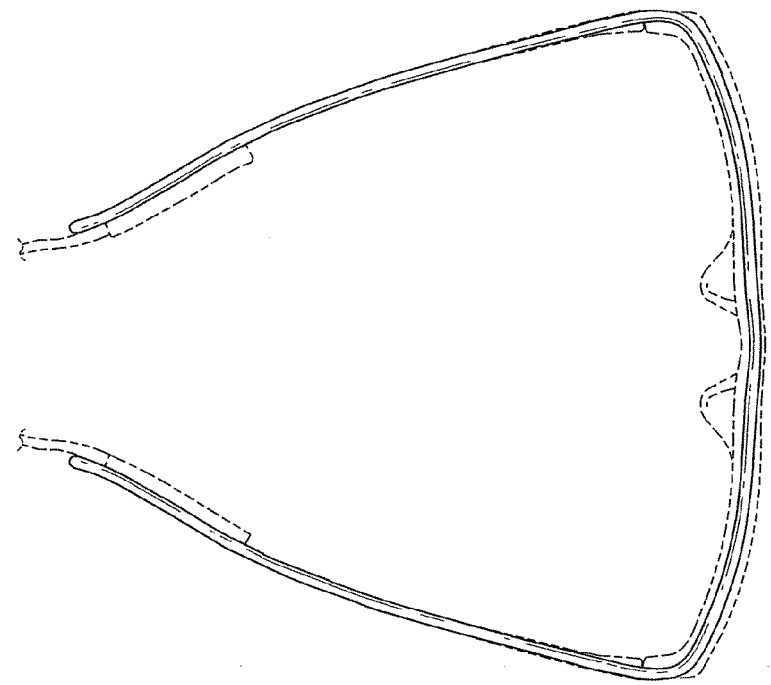
FIG. 12 is a top view of the embodiment of FIG. 11.
Figure 14:
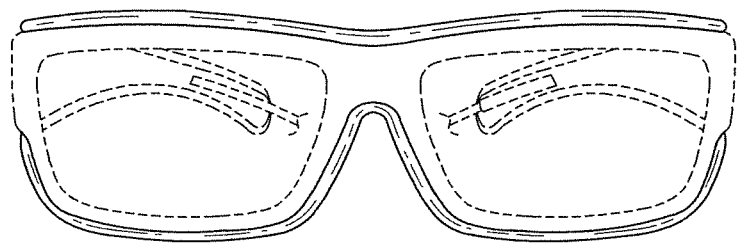
FIG. 14 is a front view of the embodiment of FIG. 11.
Figure 15:
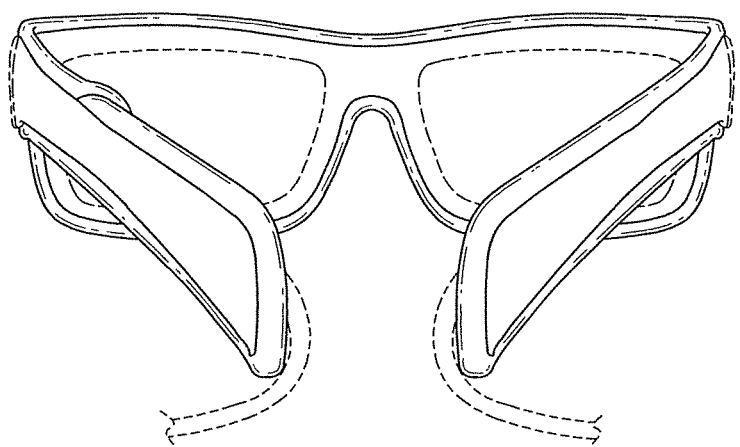
FIG. 15 is a back view of the embodiment of FIG. 11.
Figure 16:
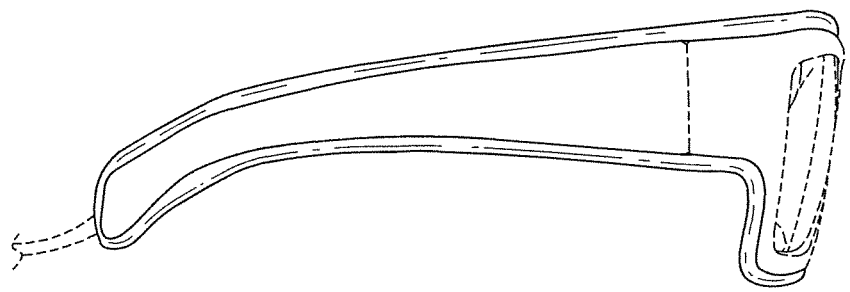
FIG. 16 is a right side view of the embodiment of FIG. 11.
Figure 17:
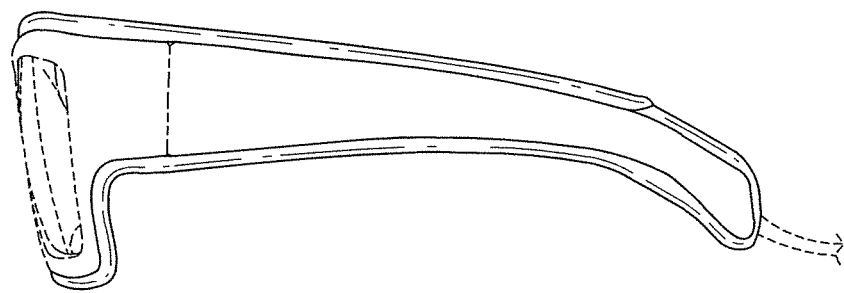
FIG. 17 is a left side view of the embodiment of FIG. 11.

With particular reference to FIG. 10A, in one preferred embodiment, the illuminated member 80 is generally tubular in cross-section, and is adhered along its length to the upper and lower edges 50, 54, 64, 66 of the frame 20. More specifically, an adhesive 100 is applied between the illuminated member 80 and each edge 50, 54, 64, 66 along the length of the edges.

As discussed above, and with particular reference to FIGS. 1-3, in the illustrated embodiment, power is provided to the electroluminescent wire 80 by the driver 84. The illustrated driver 84 is sized to accommodate a power source such as a battery and includes a control switch 104 so that a user can select between operating modes such as on, off, flashing, or the like.

As shown, the driver 84 is supported by a lanyard 88 comprising two lanyard portions 110, 113. The lanyard portions are attached to the temples 24, 26 and to the driver 84. As such, when the lanyard 88 and eyeglasses 20 are worn, the driver 84 will hang behind the wearer's neck, and have little to no effect on the comfort or stability of the eyewear.

Power from the driver 84 is communicated from the driver to the electroluminescent wire 80 on the eyewear 20 via a powered portion 110 of the lanyard 88. In the illustrated embodiment, the other portion of the lanyard is a nonpowered portion 112.

With additional reference to FIGS. 4 and 5, the nonpowered portion 112 of the lanyard 88 extends from the driver 84 to the right temple piece 24, and preferably is adhered to the inner surface 114 of the right temple piece 24 by an adhesive or the like. In the illustrated embodiment, the nonpowered portion 112 of the lanyard 88 comprises a two-strand copper-based insulated electric wire. However, it is to be understood that other materials, such as cords, various textiles and the like, can be used for the nonpowered lanyard 112. Additionally, in further embodiments, the nonpowered lanyard may use an inner member that provides structural support, and which is enclosed within a cover such as a textile cover.

With continued reference to FIGS. 1-5, the nonpowered portion 112 of the lanyard 88 comprises first and second segments 116, 118 that are detachably connected to one another by a connector 120. In other embodiments the nonpowered portion 112 can extend uninterrupted from the driver to the eyewear frame 20. The first segment 116 is attached to the driver 84, such as by having a portion of the first segment 116 adhered to a driver casing.

Figure 6:
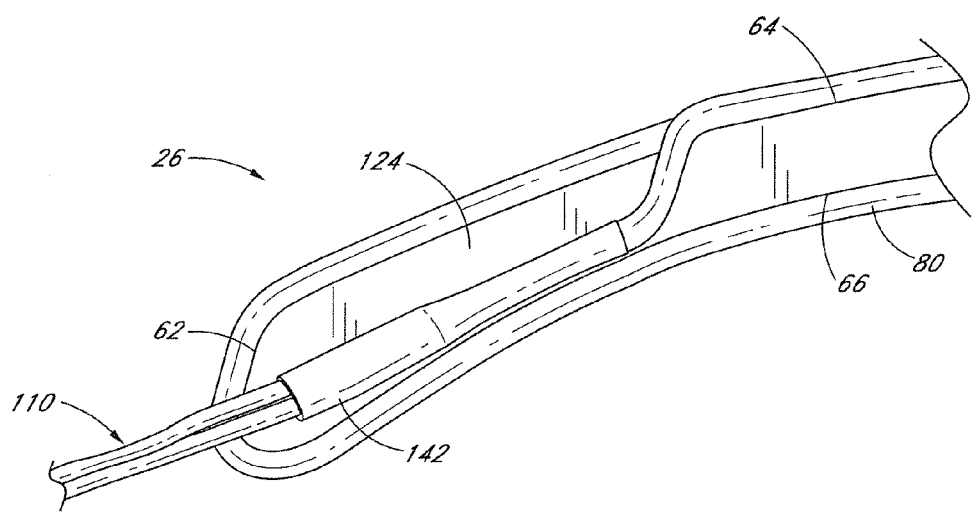
FIG. 6 is a close up view of an inner side of a left temple of the eyewear of FIG. 1.

With additional reference to FIG. 6, the powered portion 110 of the lanyard 88 extends from the driver 84 to the left temple piece 26. The illustrated powered portion 110 of the lanyard is made of a traditional, two-strand insulated copper wire, preferably chosen to have sufficient structural strength so that the wire's ability to conduct electricity is not compromised when the wire bears a structural load such as when the user lets the eyeglass frames 20 hang from the lanyard 88, which is around his neck.

The power wire 110 is physically and electrically connected to an output 122 of the driver and physically connected to the inner surface 124 of the left temple piece 26. As such, the power wire 110 also physically supports the frame 20 and driver 84 while functioning as the lanyard 88. The power wire 110 is also connected to the electroluminescent wire so as to communicate electric power from the driver to the illuminated member 80.

In the illustrated embodiment, the powered portion 110 of the lanyard 80 includes a first powered segment 126 and a second powered segment 128 that are detachably connected to one other by an electrical connector 130. The connectors 120, 130 enable the driver 84 to be detached from the frame 20. As such, the driver 84 can be easily replaced, a single driver can be used with multiple styles of eyewear frames, or the like. Of course, in other embodiments one or both lanyard portions can extend uninterrupted from the driver to the frame.

As mentioned above, in some embodiments the electrical wire 110 of the lanyard 88 can be enclosed within a cover such as a textile cover that can include desired graphics and/or can provide additional structural support so that the electrical wire does not bear substantial structural tension from supporting the driver and/or eyeglass frame.

Figure 6A:
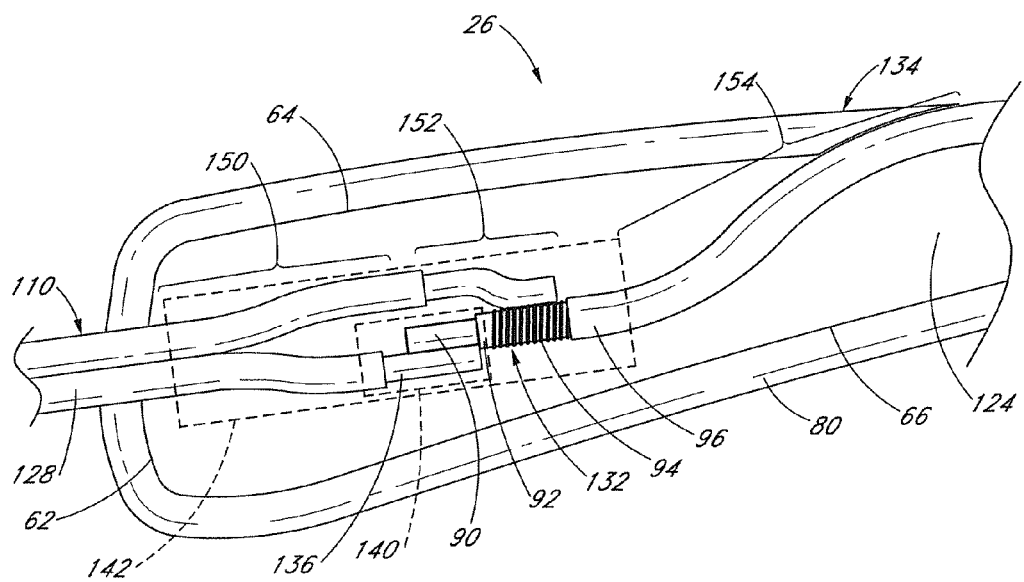
FIG. 6A shows the left temple of FIG. 6 with components and connections depicted schematically.

With specific reference to FIGS. 6 and 6A, the elongate illuminated member 80 has a first or connection end 132 and a second or termination end 134. The first or connection end 132 is attached to the power wire 110, which in turn is attached to the inner surface 124 of the left temple piece 26. In some embodiments the power wire 110 is glued or otherwise attached to the inner surface 124 of the left temple piece 26, and the connection end 132 of the illuminated member 80 is physically and electrically connected to the power wire 110 so as to be electrified thereby.

As noted above, the power wire 110 preferably comprises two strands, or wires. A first one 136 of the wires is attached to the inner wire 90 of the electroluminescent wire 80, and a second one 138 of the wires is attached to the outer wire 94 of the electroluminescent wire 80. In the illustrated embodiment, a first sleeve 140 encloses the connected first and inner wires 136, 90 and electrically insulates them. A second sleeve 142 is disposed about the connected second and outer wires 138, 92 and electrically insulates and protects them. The second sleeve 142 preferably is adhered to the inner surface 124 of the left temple piece 26 by an adhesive or the like. In some embodiments, the power wire 110 is also adhered directly to the inner surface 124 of the left temple piece 26 by an adhesive or the like.

Preferably the power wire 110 and the electroluminescent wire 80 are attached to the temple portion 26 in such a manner so that tension that may be in the power wire 110 due to its function as a lanyard 88 supporting the eyewear 20 is not communicated to the electroluminescent wire 80. As such stresses, strains and tensions of the lanyard 88 are transmitted by the power wire 110 to the temple piece 26 independent of the electroluminescent wire 80 so that the electroluminescent wire does not incur tension from the lanyard. In some embodiments the power wire 110 is structurally attached to the inner surface 124 of the temple portion 26 at a structural attachment zone 150 that is spaced from the electroluminescent wire 80. As such, there can be a space between the structural attachment zone and a part of the electroluminescent wire that is attached to the frame.

Figure 7:
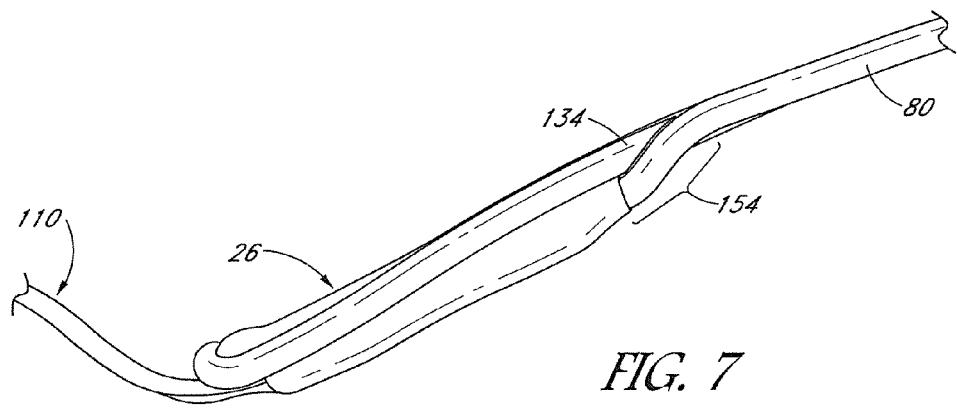
FIG. 7 is a top view of the left temple of FIG. 6.

With particular reference to FIGS. 6, 6A and 7, in the illustrated embodiment, the power wire 110 connects to the electroluminescent wire 80 in a connection zone 152. The connection zone 152 can be adhered to the inner surface 124 of the temple piece 26 in order to prevent relative movement or the like. From the connection zone 152, the electroluminescent wire 80 extends along the inner surface 124 of the temple piece 26 and transitions onto the upper edge 64 of the temple piece 26. A transition zone 154 is defined between the connection zone 152 and the point at which the electroluminescent wire 80 becomes aligned with the upper edge 64. In some embodiments the portion of the electroluminescent wire 80 on the inner surface 124 of the temple may be covered or blacked-out so that any emitted light is not visible.

In the illustrated embodiment the transition of the electroluminescent wire 80 from the inner surface 124 of the temple piece 26 to the upper edge 64 proceeds gradually so as to avoid kinks in the electroluminescent wire 80. For example, as best shown in FIG. 7, the electroluminescent wire moves from the inner surface onto the upper edge generally at an angle between about 30-60° relative to the elongate upper edge 64, and more preferably at about a 45° angle relative to the elongate upper edge 64, and then curves to align with and follow the upper edge.

With reference again to FIGS. 1-10, the electroluminescent wire 80 is adhered to and follows the upper edge 64 of the left temple piece 26, traversing any hinge gap 160 that may exist between the hinge surfaces 46, 60 of the temple 26 and front frame left tenon 42. The electroluminescent wire 80 is then adhered to and follows the upper edge 50 of the front frame 22 to the right tenon 40. The electroluminescent wire 80 then traverses any hinge gap 160 that may exist between the hinge surfaces 46, 60 of the front frame right tenon 40 and right temple piece 24 (see FIG. 8) and is adhered to and follows the length of the upper edge 64 of the right temple piece 24.

As shown, the electroluminescent wire 80 preferably also is adhered to the back edge 62 of the temple piece 24 so as to wrap around the back edge 62 and extend to the lower edge 54 of the temple piece 26. The electroluminescent wire 80 continues to be adhered to and follow the lower edge 54 of the temple piece 24, again traverses the hinge gap 160 between the hinge surfaces 46, 60 of the right temple piece and the front frame right tenon 40 to the front frame lower edge 54, and continues to be adhered to the front frame lower edge 54 along the length of the front frame 22. Preferably, the electroluminescent wire 80 exactly or substantially follows the curvature of the front frame 22 to the left tenon 42.

From the lower edge 54 of the front frame 22, the electroluminescent wire 80 traverses the hinge gap 160 to the lower edge 66 of the left temple piece 26 and is adhered to the lower edge 66 along the length of the left temple piece 26, eventually wrapping about the back edge 62 of the left temple piece so as to again be on the upper edge 64 of the left temple piece. When the electroluminescent wire 80 reaches the transition area 154, it stops at its termination end 134, adjacent and preferably abutting the portion of the electroluminescent wire 80 in the transition zone 154.

In the embodiment shown in FIG. 7, the terminal end 134 of the electroluminescent wire 80 is cut at an angle matching the angle at which the electroluminescent wire extends into the transition zone 154, which in the illustrated embodiment is about 45° relative to an axis of the wire. As such, the terminal end 134 is aligned with the electroluminescent wire 80 in the transition zone 154 on the upper edge 64. Other embodiments may not employ such a 45° or matching cut.

In the illustrated embodiment, the electroluminescent wire 80 is adhered to the eyewear frame 20 via an adhesive substantially along its entire length. More specifically, it is generally desired for the electroluminescent wire to be attached to the eyewear edges so that the wire is held securely in place. However, in some embodiments the electroluminescent wire may not exactly follow the curvature of the eyewear. For example, in some embodiments the nose cavity 32 or the bottom edge at the tenon (see, for example, FIG. 8) may have an acute angle that creates a risk of kinking in the electroluminescent wire. As such, it may be desired to space a portion of the wire from the frame edge at particular locations.

Figure 8:
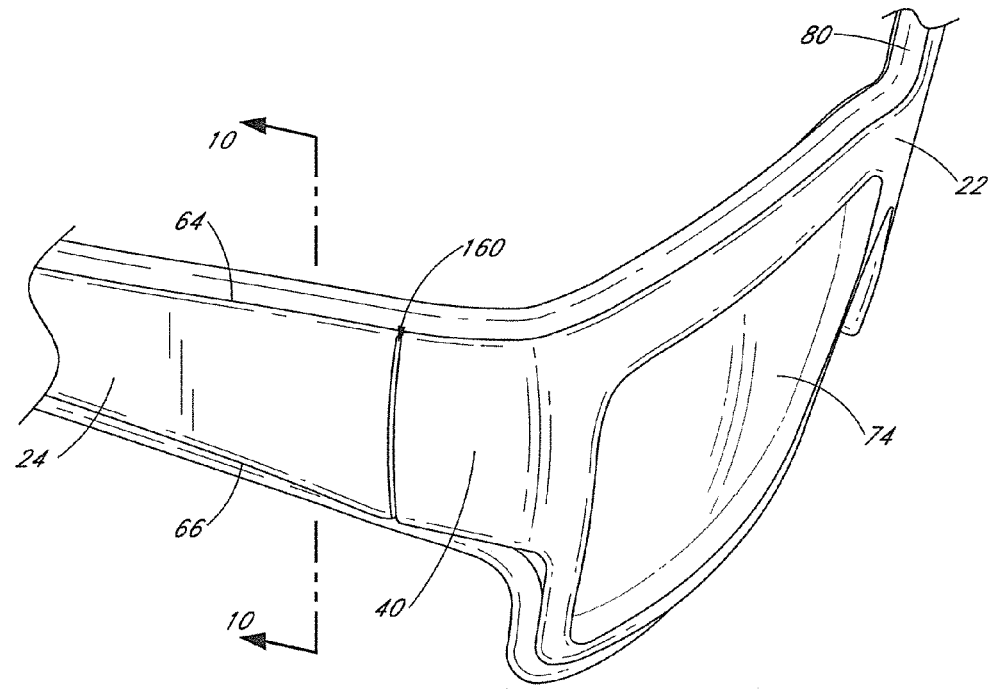
FIG. 8 is a perspective view of a right corner of the eyewear of FIG. 1.
Figure 9A:
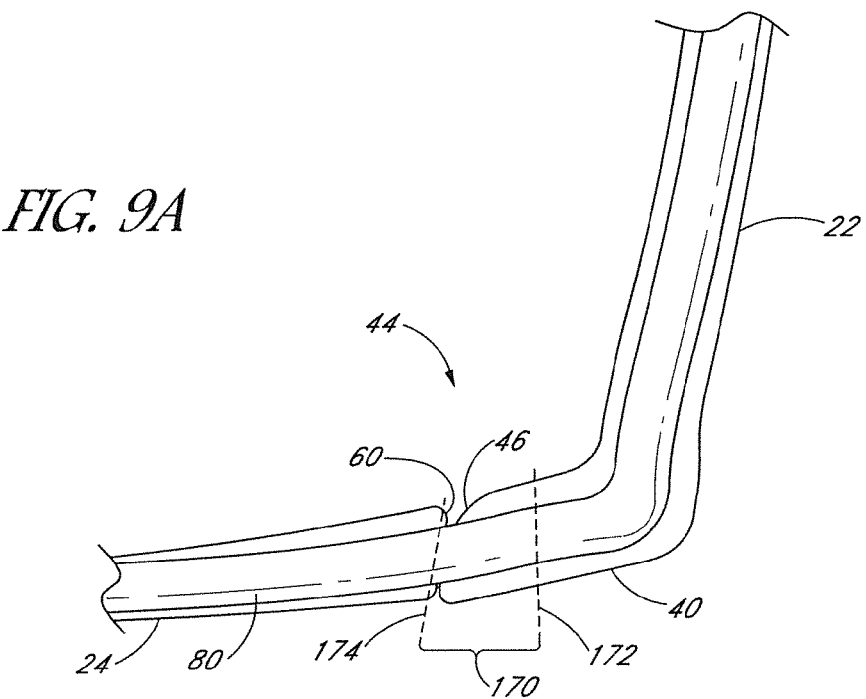
FIG. 9A is a top view of the right corner depicted in FIG. 8, with the eyewear in an open position.
Figure 9B:
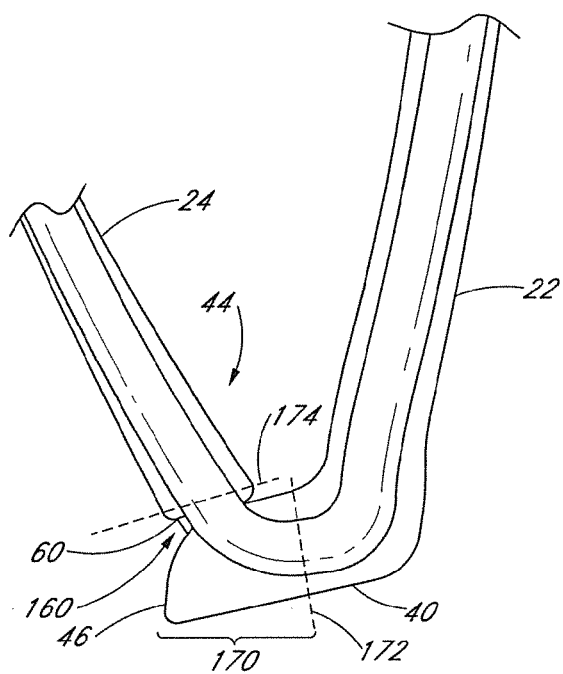
FIG. 9B is a top view of the right corner depicted in FIG. 8, with the eyewear in a closed position.

With particular reference to FIGS. 8, 9A and 9B, and as discussed above, the elongate illuminated member 80 (which is the electroluminescent wire in the illustrated embodiment) traverses the hinge gaps 160 between the hinge surfaces 46, 60 of the front frame 22 and temple pieces 24, 26 along both the upper and lower edges 50, 64, 54, 66. As noted above, it is desired to minimize tension in the electroluminescent wire 80. However, when the temple pieces 24, 26 move between the open and closed positions as illustrated in FIGS. 9A and 9B, the movement of the temple pieces 24, 26 relative to the front frame 22 is liable to create tension in the electroluminescent wire 80.

In the illustrated embodiment, an unconnected zone 170 is defined along each upper and lower edge at and adjacent the hinge gaps 160. The unconnected zone 170 is defined between a front frame glue stop 172 and a temple glue stop 174. Although adhesive is generally applied to the electroluminescent wire 80 along its length, there is no adhesive holding the wire to the respective edge in the unconnected zone 170 between the glue stops 172, 174. As such, and as best shown in FIGS. 9A and 9B, when the temple piece 24 is moved from the open position to the closed position, the portion of the electroluminescent wire 80 in the unconnected zone 170 slides over the associated edge surface 50, accommodating the relative movement of the temple piece 26 and front frame 22 without stretching in the electroluminescent wire 80.

In the illustrated embodiment, the unconnected zone 170 is almost entirely positioned on the front frame 22, and the temple glue stop 174 is at or immediately adjacent the hinge surface 60 of the temple piece 26. It is to be understood, however, that in other embodiments the unconnected zone can be configured and positioned in other ways. For example, in some embodiments the unconnected zone may be entirely or almost entirely on the temple piece, while in still other embodiments the unconnected zone may be distributed between the temple piece and front frame.

It is to be understood that with some types of hinges, the distance between the temple glue stop and the front frame glue stop may change somewhat between the open and closed positions. A maximum distance between the glue stops may be defined at a point between the open and closed positions. Preferably the electroluminescent wire is attached to the temple and front frame members while the eyewear is in the position at which the distance between the temple and front frame glue stops is at its greatest. As such, during the opening and closing motions, the electroluminescent wire will not be substantially stretched, and substantial tension will not be applied to the electroluminescent wire. In some such embodiments, during at least part of the range between the open and closed positions, the portion of the electroluminescent wire in the unconnected zone may be longer than the distance between the glue stops, and the wire may experience of compression along its length and/or deflection.

The illustrated embodiment presents a sample construction employing inventive principles disclosed herein. It is to be understood, however, that in other embodiments the electroluminescent wire or other elongate illumination device may be more complex than in the embodiment as discussed above, and may be able to accommodate various lighting routines and the like. For example, the elongate illumination device may comprise an electroluminescent wire having three or more wires and multiple colors in order to provide more interesting light effects. Also, in some embodiments the driver may include a microcontroller and may be able to accommodate complex electronic routines and controls. For example, in some embodiments the driver may offer a number of lighting routines controlling color, flashing, interesting light effects or the like. In still other embodiments, the driver may include a microphone or other sensor that detects music or a musical beat and outputs a lighting scheme that complements the musical beat. Still further, in some embodiments the driver may have a wireless connection to a remote input device that may or may not be controlled by the user so that the driver can be controlled remotely. The driver can also have different configurations than as specifically shown and discussed herein. For example, in some embodiments a miniaturized driver can be incorporated or directly attached to some portion of the frame, and a lanyard may not be employed.

In the preferred embodiment discussed above, the electroluminescent wire 80 is connected to the upper and lower edges 50, 64, 54, 66 along their lengths by adhesive 100. As shown in FIG. 10A, this connection can be made without altering the eyewear. More specifically, and in one embodiment, a regular or stock item of eyewear can be purchased off-the-shelf, and the electroluminescent wire 80 can be adhered to the upper and lower edges of the eyewear without any further modification of the eyewear. As such, the method of attachment can be accomplished for the style shown or many other styles of eyewear having different types of construction and shapes.

Other embodiments may include structural changes specific to the eyewear, or specific eyewear designs made to accommodate an elongate illuminated member. For example, with reference next to FIG. 10B, in one embodiment an eyewear frame comprises a channel 180 along the first and second, or upper and lower, edges 50, 54, 64, 66. The channel 180 is shaped and configured to accommodate at least a portion of the illuminated member 80. In the illustrated embodiment the channel 180 is curved to generally correspond to the circular cross section of the electroluminescent wire 80. As such, an adhesive 100 can be applied in the channel 180 and the electroluminescent wire 80 pressed into the channel 180 to be held securely therein. Such structure may enhance and ease construction and assembly of a product. In still further embodiments the channel and illuminated member can be configured so that the illuminated member is mechanically held within the channel such as by a lip, detent or the like. In some embodiments, the channels may terminate at or adjacent the unconnected zones 170 so that in the unconnected zones the illuminated member can slide over a flat edge surface. Preferably a transition is provided from the channel to the flat edge surface.

In the illustrated embodiments, the electroluminescent wire 80 traverses the hinge gaps 160 between the front frame 22 and temple pieces 24, 26 along both the upper 50, 64 and lower 54, 66 edges of the eyewear. This achieves a unique and pleasing visual effect, as a space is maintained between the portions of the illuminated member on the upper and lower edges at and adjacent the tenons.

With reference next to FIGS. 11-17, an embodiment is shown displaying a design of illuminated eyewear. As indicated by phantom lines, the particular shape and design of the frame can change and is provided only for reference. Of particular interest in this design is that the electroluminescent wire extends along the upper and lower edges of the front frame and both of the temple pieces, spanning the hinge gaps so that there is a space between the upper and lower illuminated members at the tenons and hinge gaps.

In the embodiment illustrated in FIGS. 11-17, the electroluminescent wire extends all the way to and around the back edges of the temple pieces. It is to be understood that, in other embodiments, the electroluminescent wire may not extend all the way to the back edges. Instead, prior to reaching the back edge, the electroluminescent wire may diverge from the upper edge, cross the temple piece on the inner or outer surface, and transition onto the lower edge. Preferably such a crossover will be spaced from the hinge gaps so that the portions of the illuminated member on the upper and lower edges at and adjacent the hinges will remain spaced apart from one another, creating the visual effect of spaced apart glowing wires at the hinge.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. An illuminated eyewear, comprising:
    a frame comprising a front frame portion and first and second temple pieces that are hingedly connected to the front frame portion;
    the front frame portion comprising first and second tenons, each tenon having a tenon hinge surface, a first edge of the front frame portion extending from the first tenon to the second tenon, a second edge of the front frame portion also extending from the first tenon to the second tenon and being spaced from the first edge of the front frame portion, the tenon hinge surfaces extending between the first and second edges of the front frame portion;
    each of the first and second temple pieces being elongate, extending from a temple hinge surface to a back edge, and having spaced apart first and second edges that extend from the temple hinge surface to the back edge, the back edge and temple hinge surface each extending between the first and second edges of the temple piece;
    the temple pieces being hingedly attached to the front frame portion so that the temple pieces rotate between an open position and a closed position, each temple hinge surface facing the associated tenon hinge surface when in the open position, a hinge gap defined between each edge of the front frame tenon and the associated edge of each temple piece;
    an elongate illuminated member adhered to the first edges of the first and second temple pieces and front frame portion, the elongate illuminated member spanning the hinge gap along the first edge between the first temple portion and the front frame and spanning the hinge gap along the first edge between the second temple portion and the front frame; and
    an unconnected zone defined along the first edges at and adjacent each hinge gap; the elongate illuminated member not being adhered to the frame in the unconnected zone so that the illuminated member can slide over the associated first edge when the temple pieces move between the open and closed positions.

2. An illuminated eyewear as in claim 1, wherein the elongate illuminated member is adhered to the second edges of the first and second temple pieces and front frame portion, the elongate illuminated member spanning the hinge gap along the second edges between the first temple portion and the front frame and spanning the hinge gap along the second edges between the second temple portion and the front frame, the illuminated member not being adhered to the frame in an unconnected zone defined along the second edges at and adjacent each hinge gap.

3. An illuminated eyewear as in claim 2, wherein at each of the hinge gaps the portion of the elongate illuminated member extending along the first edges is spaced from the portion of the elongate illuminated member extending along the second edges.

4. An illuminated eyewear as in claim 2, wherein the unconnected zone defined along the second edges is aligned with the unconnected zone defined along the first edges.

5. An illuminated eyewear as in claim 2, wherein the elongate illuminated member joins the first edge of the first temple at a beginning point, and the illuminated member extends from the beginning point along first edges of the first temple, front frame and at least part of the second temple, crosses from the first edge of the second temple to the second edge of the second temple, and extends along the second edges of the second temple, front frame and at least part of the first temple, and further crosses from the second edge of the first temple to the first edge of the first temple, wherein a terminal end of the elongate illuminated member is at or adjacent the beginning point.

6. An illuminated eyewear as in claim 5, wherein the elongate illuminated member extends along the back edges of the first and second temples.

7. An illuminated eyewear as in claim 5, wherein the elongate illuminated member crosses between the first and second edges of each temple at a location spaced from the back edge of the respective temple.

8. An illuminated eyewear as in claim 5, wherein a first end of the elongate illuminated member is attached to an inner surface of the first temple, and the elongate illuminated member transitions from the inner surface to the first edge at an angle between about 30-60° relative to the temple edge.

9. An illuminated eyewear as in claim 8, wherein the terminal end of the elongate illuminated member is cut at an angle between about 30-60° relative to the temple edge.

10. An illuminated eyewear as in claim 2, wherein the first and second edges each comprise a seat configured to receive at least a portion of the elongate illuminated member.

11. An illuminated eyewear as in claim 1 additionally comprising a power driver suspended on a lanyard comprising a powered portion and a non-powered portion, the non-powered portion of the lanyard connecting the power driver to the second temple piece, the powered portion of the lanyard connecting the power driver to the first temple piece.

12. An illuminated eyewear as in claim 1, wherein a length of the unconnected zone changes as the first temple piece is rotated between the open and closed positions, and the elongate illuminated member is adhered to the first edges so that the length of the elongate illuminatable member between opposite ends of the unconnected zone is no less than a maximum length of the unconnected zone.

13. An illuminated eyewear as in claim 11, wherein the powered portion of the lanyard is connected to the inner surface of the first temple piece and comprises a first end electrically connected to the elongate illuminated member so that tension within the powered portion of the lanyard is communicated to the first temple piece and not the elongate illuminated member.

14. An illuminated eyewear as in claim 13, wherein the elongate illuminated member comprises an electroluminescent wire.

15. A method of making an illuminated eyewear, comprising:

adhering an elongate illuminatable member along a length of a first edge of a first temple piece of an eyewear frame so that the elongate illuminatable member is aligned with the first edge, the first temple piece and a second temple piece of the eyewear frame being hingedly connected to a front frame portion so that the first and second temple pieces can rotate between an open and a closed position, the first edge of the first temple piece being aligned with a first edge of the front frame portion when the first temple piece is in the open position, a joint defined between the first temple piece and the front frame portion when the first temple piece is in the open position;

adhering the elongate illuminatable member to the edge of the front frame portion so that an unconnected portion is defined along one or both of the first edges at and adjacent the joint;

arranging the elongate illuminatable member in the unconnected portion so that it is aligned with the first edge and traverses the joint in the unconnected portion when in the open position, and so that the elongate illuminatable member slides over the edge in the unconnected portion when the first temple piece is rotated from the open position to the closed position; and connecting the elongate illuminatable member to a source of electrical power.

16. A method as in claim 15, wherein connecting the source of electrical power to the elongate illuminatable member comprises connecting a first end of a power wire to a power output of a power driver and connecting a second end of the power wire to the elongate illuminatable member, and additionally comprising attaching the portion of the power wire spaced from the second end to the temple piece so that tension forces in the power wire are transferred to the temple piece and not to the elongate illuminatable member.

17. A method as in claim 15, wherein the unconnected portion has a maximum length when the first temple piece is at a point between the open and closed positions, and additionally comprising attaching the elongate illuminatable member to the first edges when the first temple piece is positioned at the point.

* * * * *